US012645657B2

(12) United States Patent　　　(10) Patent No.:　US 12,645,657 B2
MacNicol et al.　　　　　　　　　(45) Date of Patent:　　Jun. 2, 2026

(54) PERFORMING IN-MEMORY COLUMNAR ANALYTIC QUERIES ON EXTERNALLY RESIDENT DATA

(71) Applicant: Oracle International Corporation, Redwood Shores, CA (US)

(72) Inventors: Roger Dermot MacNicol, Stevens, PA (US); Xia Hua, Mountain View, CA (US); Allison Holloway, San Carlos, CA (US); Shasank Kisan Chavan, Menlo Park, CA (US); Jesse Kamp, Castro Valley, CA (US); Maria Colgan, Menlo Park, CA (US); Tirthankar Lahiri, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/143,768

(22) Filed: May 5, 2023

(65) Prior Publication Data

US 2023/0273910 A1　　Aug. 31, 2023

Related U.S. Application Data

(63) Continuation of application No. 16/135,748, filed on Sep. 19, 2018, now Pat. No. 11,675,761.

(Continued)

(51) Int. Cl.
*G06F 16/22*　　　(2019.01)
*G06F 16/21*　　　(2019.01)
(Continued)

(52) U.S. Cl.
CPC .......... *G06F 16/221* (2019.01); *G06F 16/219* (2019.01); *G06F 16/2237* (2019.01);
(Continued)

(58) Field of Classification Search
None
See application file for complete search history.

(56) References Cited

U.S. PATENT DOCUMENTS

| 9,916,352 B2 | 3/2018 | Chaudhry et al. |
| 10,599,625 B2 | 3/2020 | Tran et al. |
| (Continued) | | |

OTHER PUBLICATIONS

KD Nuggets, "Apache Arrow and Apache Parquet: Why We Needed Different Projects for Columnar Data, On Disk and In-Memory", www.kdnuggets.com/2017/02/apache-arrow-parquet-columnar-data, Feb. 2017, 8pgs.

*Primary Examiner* — Dawaune A Conyers
(74) *Attorney, Agent, or Firm* — Hickman Becker Bingham Ledesma LLP

(57) ABSTRACT

Techniques herein use in-memory column vectors to process data that is external to a database management system (DBMS) and logically join the external data with data that is native to the DBMS. In an embodiment, a computer maintains a data dictionary for native data that is durably stored in an DBMS and external data that is not durably stored in the DBMS. From a client through a connection to the DBMS, the computer receives a query. The computer loads the external data into an in-memory column vector that resides in random access memory of the DBMS. Based on the query and the data dictionary, the DBMS executes a data join of the in-memory column vector with the native data. To the client through said connection, the computer returns results of the query based on the data join.

20 Claims, 12 Drawing Sheets

Related U.S. Application Data

(60) Provisional application No. 62/566,386, filed on Sep. 30, 2017.

(51) Int. Cl.

| | | |
|---|---|---|
| *G06F 16/2455* | (2019.01) | |
| *G06F 16/2458* | (2019.01) | |
| *G06F 16/248* | (2019.01) | |
| *G06F 16/25* | (2019.01) | |

(52) U.S. Cl.
CPC ...... *G06F 16/2455* (2019.01); *G06F 16/2456* (2019.01); *G06F 16/2471* (2019.01); *G06F 16/248* (2019.01); *G06F 16/256* (2019.01)

(56) References Cited

U.S. PATENT DOCUMENTS

| | | | | |
|---|---|---|---|---|
| 2013/0151502 A1* | 6/2013 | Yoon | ..................... | G06F 16/221 |
| | | | | 707/E17.017 |
| 2014/0317084 A1 | 10/2014 | Chaudhry et al. | | |
| 2015/0088809 A1* | 3/2015 | Kociubes | .............. | G06F 16/283 |
| | | | | 707/605 |
| 2015/0213072 A1 | 7/2015 | Chen et al. | | |
| 2015/0356131 A1* | 12/2015 | McClary | ............ | G06F 16/2282 |
| | | | | 707/769 |
| 2016/0070726 A1* | 3/2016 | Macnicol | ............ | G06F 11/0745 |
| | | | | 707/691 |
| 2017/0017683 A1 | 1/2017 | Fourny et al. | | |
| 2017/0116242 A1 | 4/2017 | Chavan et al. | | |
| 2017/0147618 A1* | 5/2017 | Geissinger | .............. | G06F 16/25 |
| 2017/0243028 A1 | 8/2017 | LaFever et al. | | |
| 2019/0095487 A1 | 3/2019 | Le et al. | | |

* cited by examiner

FIG. 2

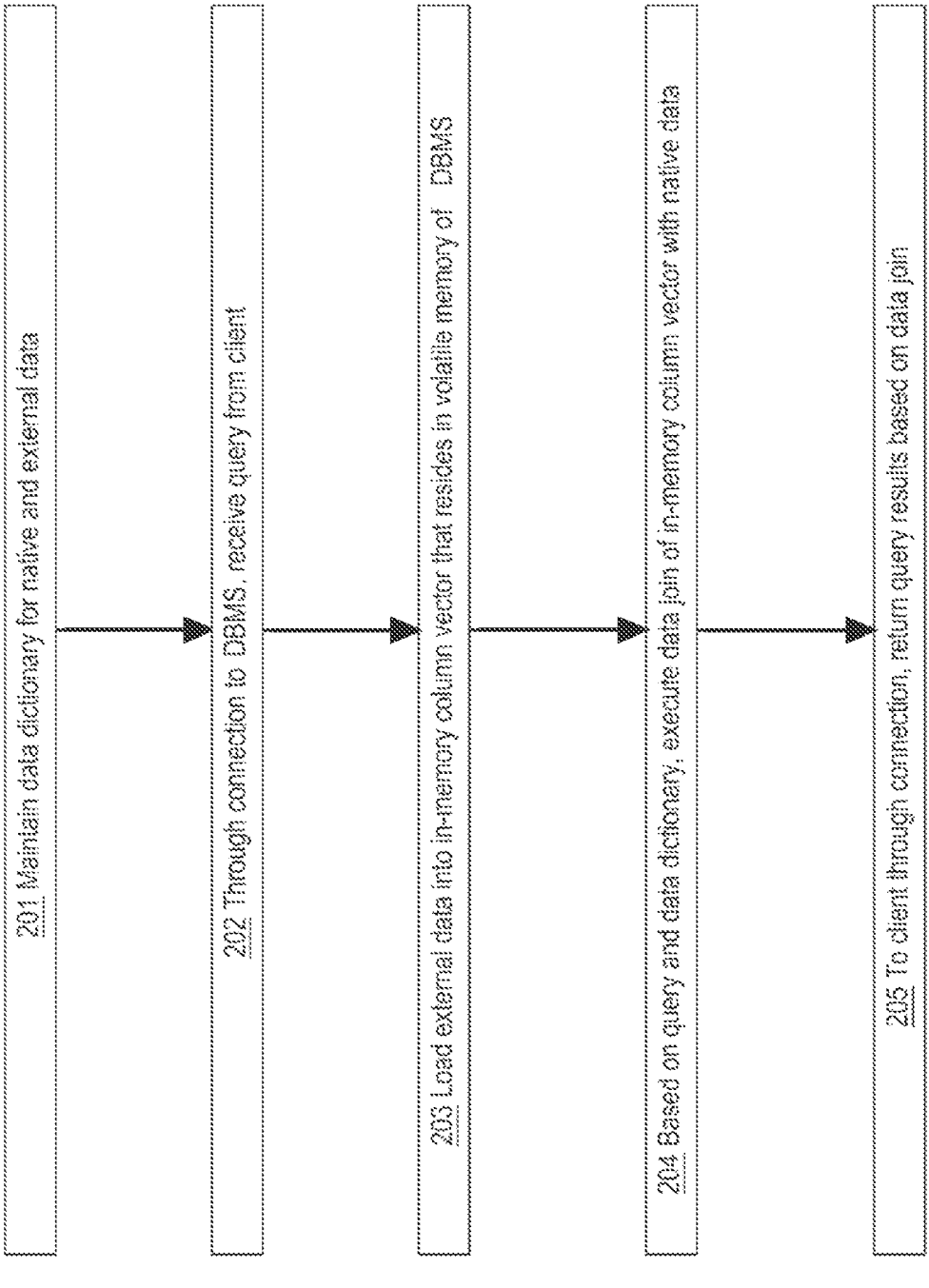

201 Maintain data dictionary for native and external data

202 Through connection to DBMS, receive query from client

203 Load external data into in-memory column vector that resides in volatile memory of DBMS 204 Based on query and data dictionary, execute data join of in-memory column vector with native data 205 To client through connection, return query results based on data join

PERFORMING IN-MEMORY COLUMNAR ANALYTIC QUERIES ON EXTERNALLY RESIDENT DATA

CROSS-REFERENCE TO RELATED APPLICATIONS; BENEFIT CLAIM

This application claims the benefit as a continuation of application Ser. No. 16/135,748, filed Sep. 19, 2018, by Roger Dermot MacNicol et al., which claims the benefit under 35 U.S.C. § 119(e) of provisional application 62/566,386, filed Sep. 30, 2017, titled "PERFORMING IN-MEMORY COLUMNAR ANALYTIC QUERIES ON EXTERNALLY RESIDENT DATA. This application is related to the following applications, the entire contents of which is hereby incorporated by reference as if fully set forth herein:

U.S. patent application Ser. No. 15/162,235 filed May 23, 2016, titled "Efficient In-Memory DB Query Processing Over Any Semi-Structured Data Formats", U.S. patent application Ser. No. 14/733,691 filed Jun. 8, 2015, titled "Storage-Side Scanning on Non-Natively Formatted Data", U.S. Pat. No. 10,007,691 filed Aug. 11, 2015, titled "Prioritizing Repopulation of In-Memory Compression Units", U.S. patent application Ser. No. 15/294,460 filed Oct. 14, 2016, titled "In-Memory Column-Level Multi-Versioned Global Dictionary for In-Memory Databases", U.S. patent application Ser. No. 14/097,575 filed on Dec. 5, 2013, titled "Combined Row And Columnar Storage For In-Memory Databases For OLTP And Analytics Workloads", U.S. patent application Ser. No. 15/713,365 filed on Sep. 22, 2017, titled "Leveraging Columnar Encoding For Query Operations", U.S. patent application Ser. No. 15/702,431 filed on Sep. 12, 2017, titled "Efficient Evaluation Of Queries With Multiple Predicate Expressions", U.S. patent application Ser. No. 15/702,659 filed on Sep. 12, 2017, titled "Efficient Evaluation Of Query Expressions Including Grouping Clauses", U.S. patent application Ser. No. 15/702,526 filed on Sep. 12, 2017, titled "Efficient Evaluation Of Aggregate Functions".

FIELD OF THE DISCLOSURE

This disclosure relates to database integration. Presented herein are techniques for using in-memory column vectors to process data that is external to a relational database management system (RDBMS) and logically join the external data with relational table data that is native to the RDBMS.

BACKGROUND

An important business use case for enterprise database users entails integrating data silos, such as corporate data (e.g. sales records) in an RDBMS and ephemeral data such as a clickstream in Hadoop distributed filesystem (HDFS). For example, an accountant may need a report that integrates data from the two silos. A data scientist may want to write exploratory queries, such as with online analytical processing (OLAP), that integrate data from the two silos. However, extract/transfer/load (ETL) tools are far from seamless and may require various custom scripts and adapters to accom-plish whatever staging and reformatting might help integration. For example, ETL typically needs to actually copy external data into a relational database table in order to make the data accessible to queries.

The expense of ETL often is worthwhile due to the potential value of the external data (e.g. Big Data), especially when correlated with relational data. Big Data has intrinsic value, but it must be discovered. There are a range of quantitative and investigative techniques to derive value from data, from discovering a consumer preference or sentiment, to making a relevant offer by location, or for identifying a piece of equipment that is about to fail. The technological breakthrough is that the cost of data storage and computation has exponentially decreased, yielding an abundance of data from which statistical analysis on an entire data set is possible. Sampling is no longer necessary for feasibility. That technological breakthrough makes much more accurate and precise decisions possible. However, finding value also requires new discovery processes involving clever and insightful analysts, business users, and executives. For example, one Big Data challenge is a human one, which is learning to ask the right questions, recognizing patterns, making informed assumptions, and predicting behavior.

However, ETL may be a poor fit for Big Data for a few reasons. One problem is that Big Data is high volume. While volume indicates more data, it is the granular nature of the data that is unique. Big data may entail processing high volumes of low-density, unstructured Hadoop data (data of unknown value, such as ticker data feeds, click streams on a web page and a mobile app, network traffic, sensor-enabled equipment capturing data at the speed of light, and many more). Hadoop data warehouse tools such as Apache Hive may help to some extent. However even though Hive and RDBMS may seem similar because they both accept structured query language (SQL), a drastic difference in latency between the two means that they may never be substitutes of each other.

New unstructured data types may be another Big Data problem. Unstructured and semi-structured data types, such as text, audio, and video require additional processing to both derive meaning and the supporting metadata. Once understood, unstructured data has many of the same requirements as structured data, such as summarization, lineage, auditability, and privacy. Further complexity arises when data from a known source changes without notice. Frequent or real-time schema changes are an enormous burden for both transaction and analytical environments. Column stores such as Apache Cassandra may help to some extent but are not amenable to integration with an RDBMS.

Ephemeral data typically undergoes rounds of map/reduce (e.g. Hadoop) processing to achieve a reduced form prior to joining with relational data. There was a choice of using slow external table scans each time the results of the map/reduce job are joined, or importing the external data into relational database table (e.g. Oracle heap table) using space and needlessly generating redo when the table contents will be truncated next time the map/reduce job runs. Thus, storage footprint and redo generation may degrade performance of a heterogeneous data warehouse integration.

Figure 3:
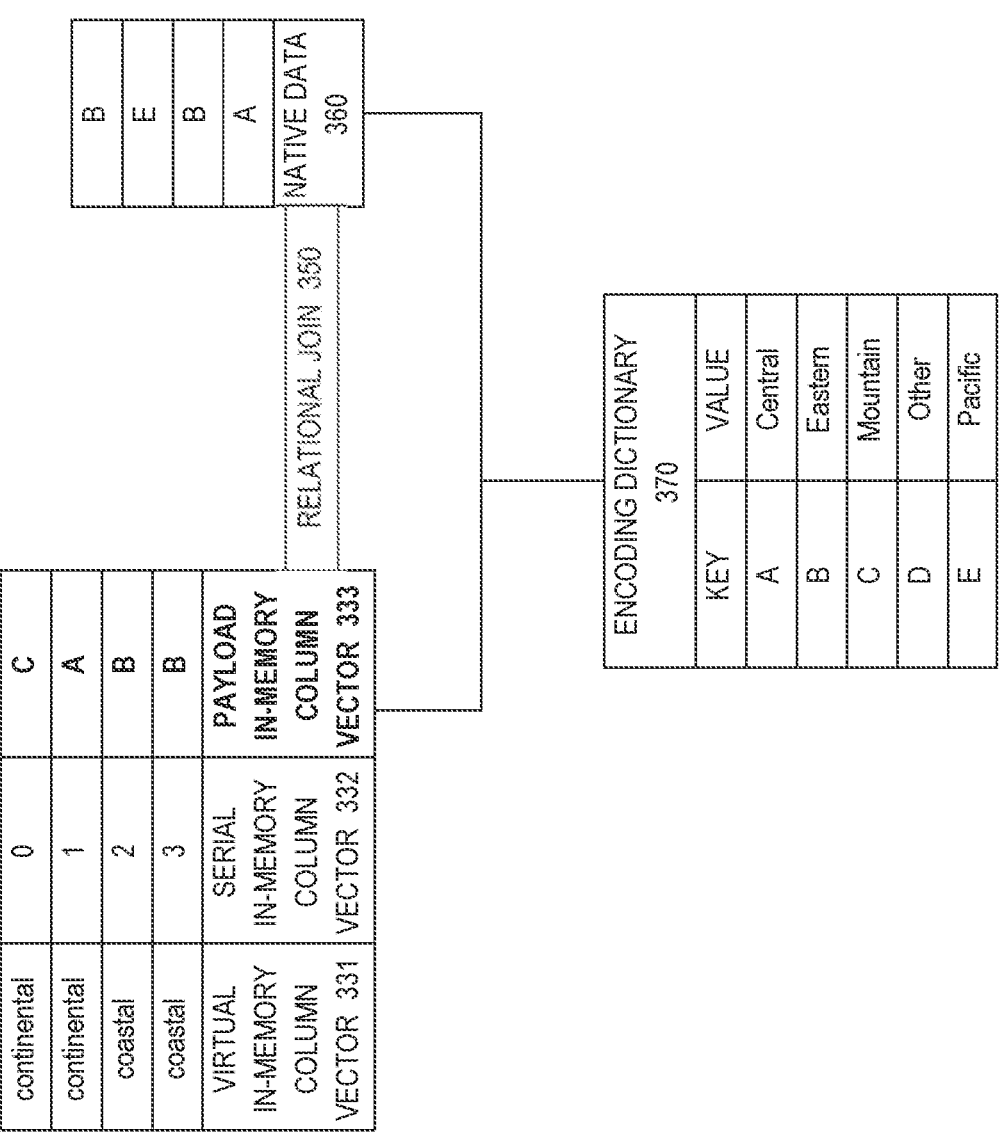
Figure 4:
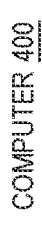
Figure 5:
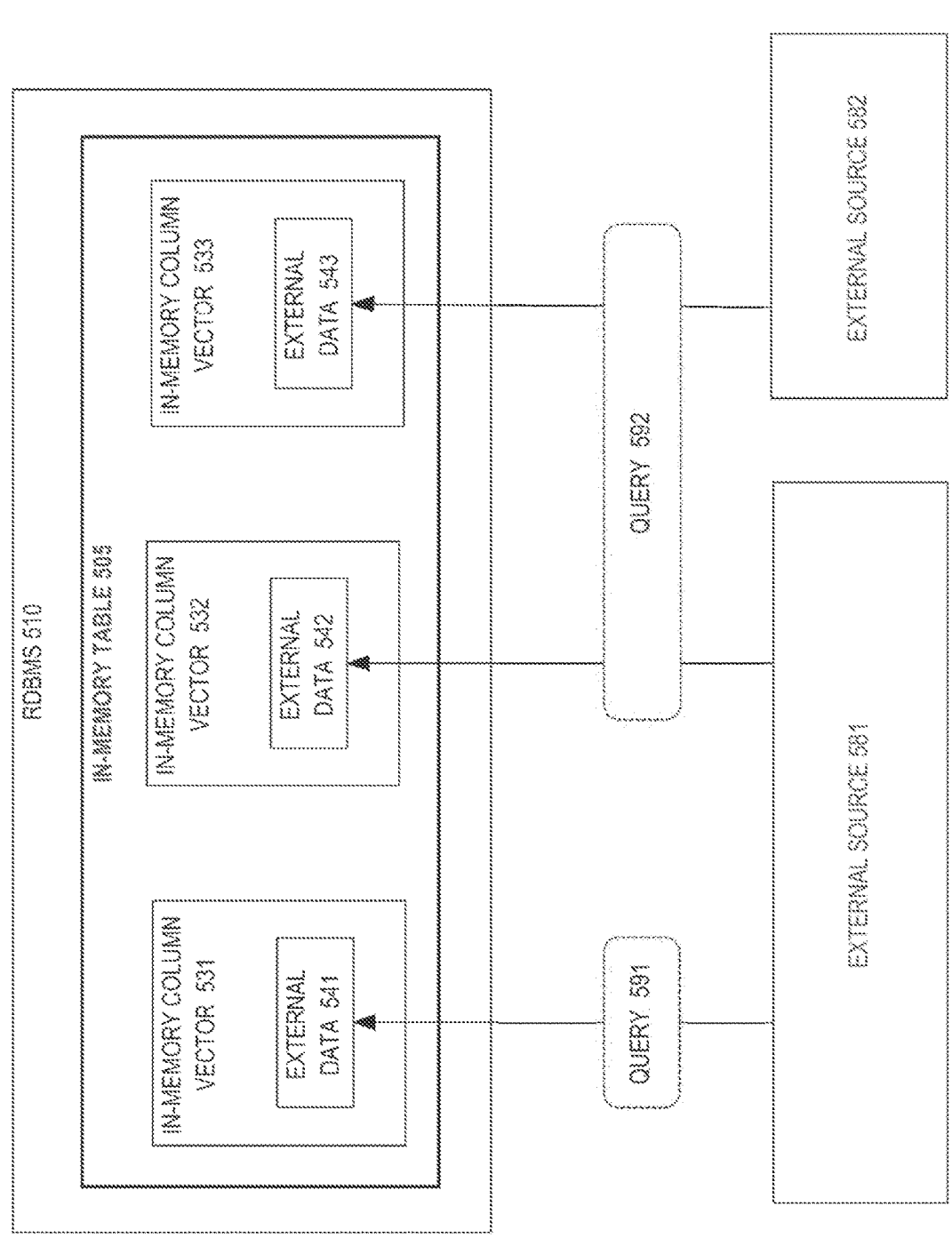
Figure 6:
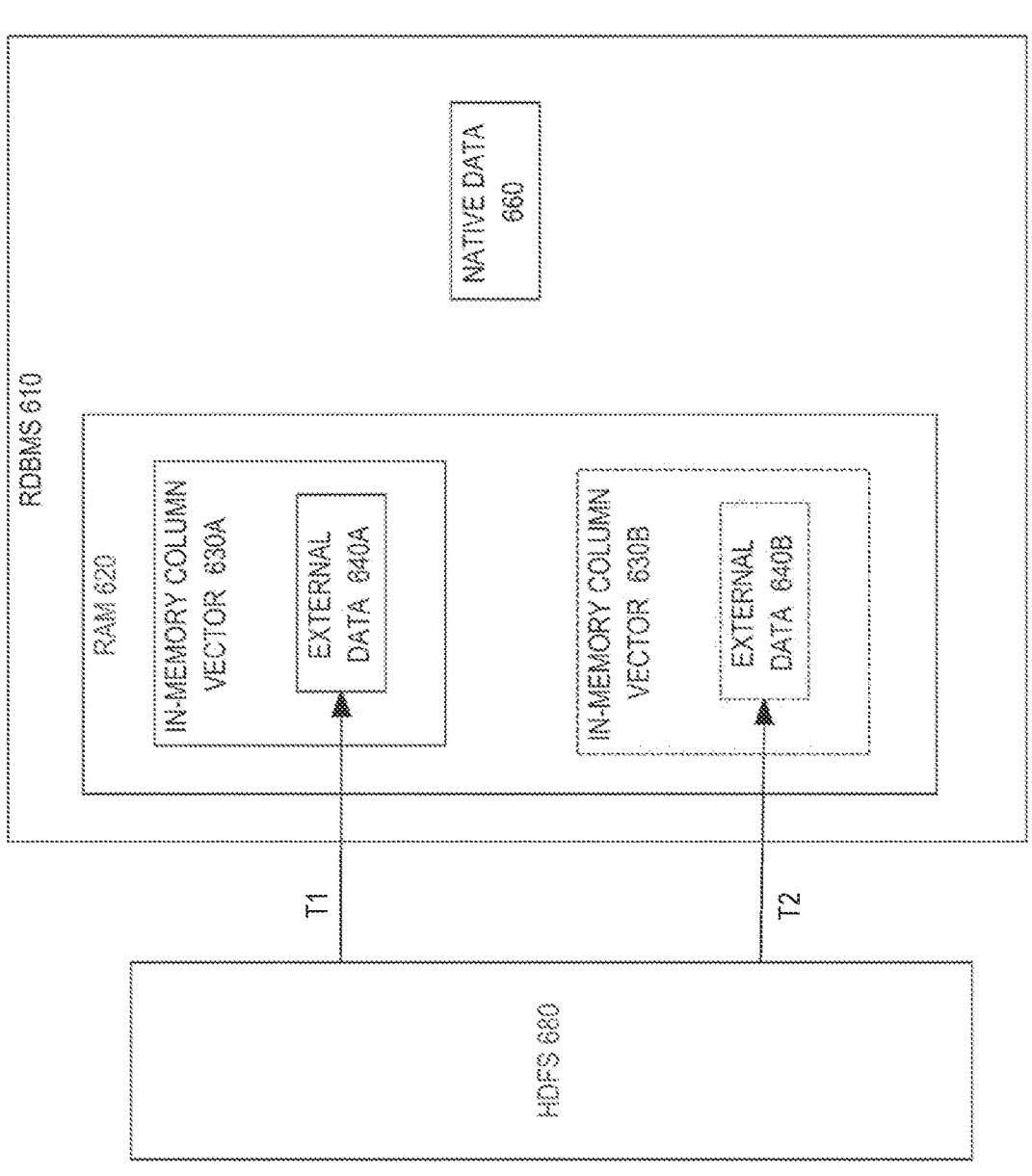
Figure 7:
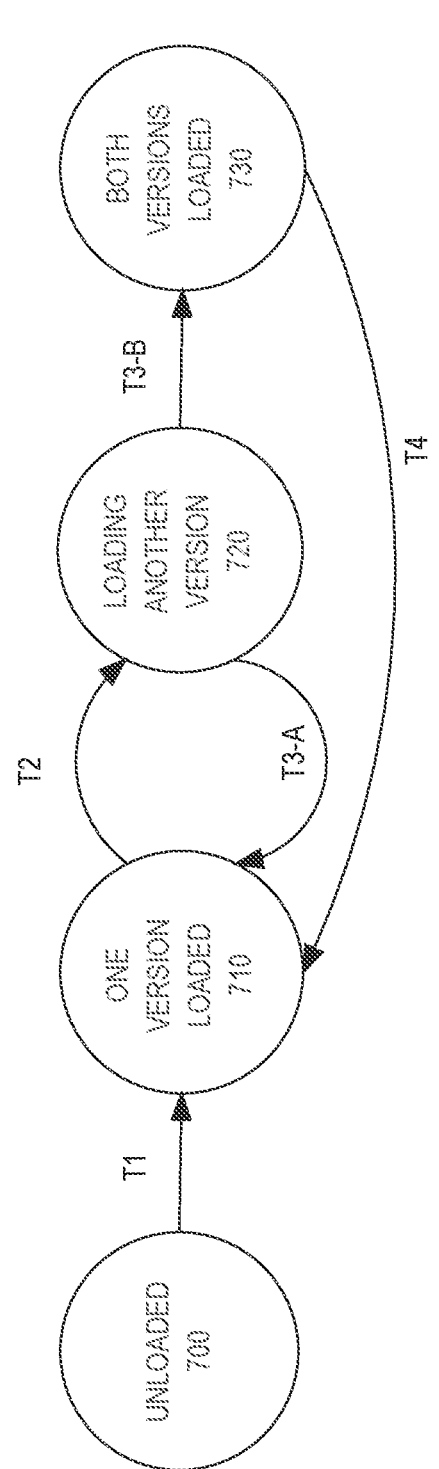
Figure 8:
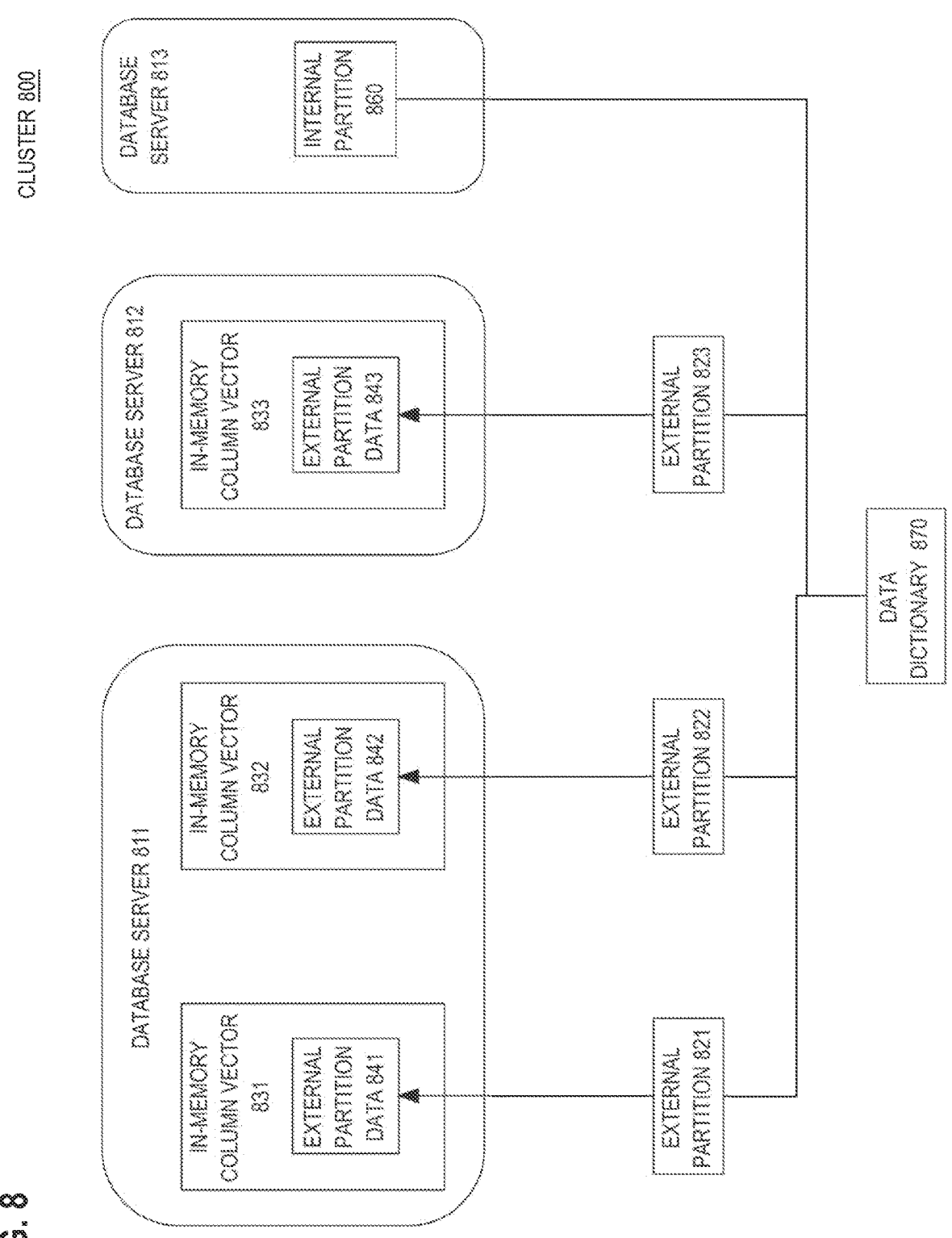
Figure 9:
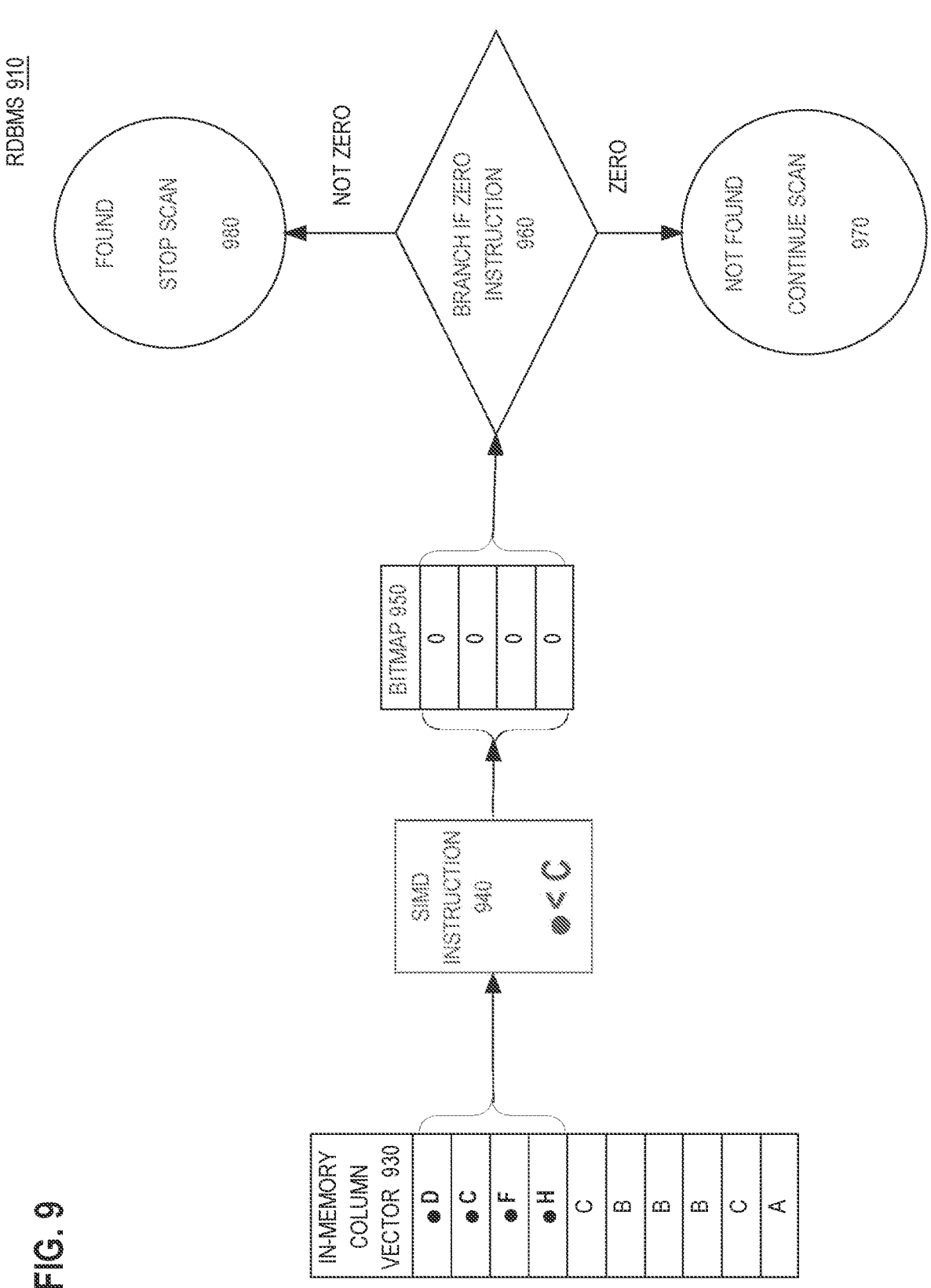
Figure 10:
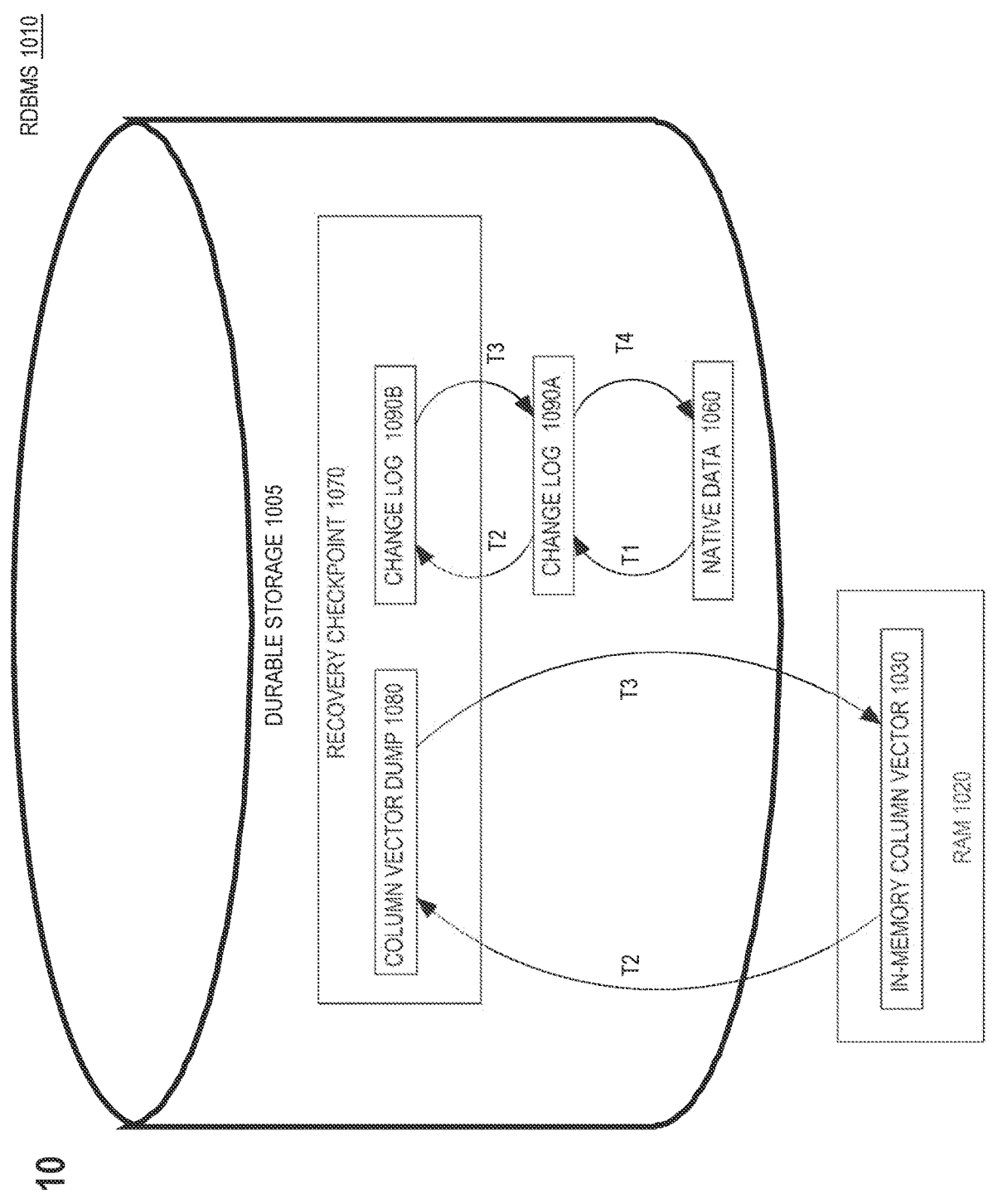
Figure 11:
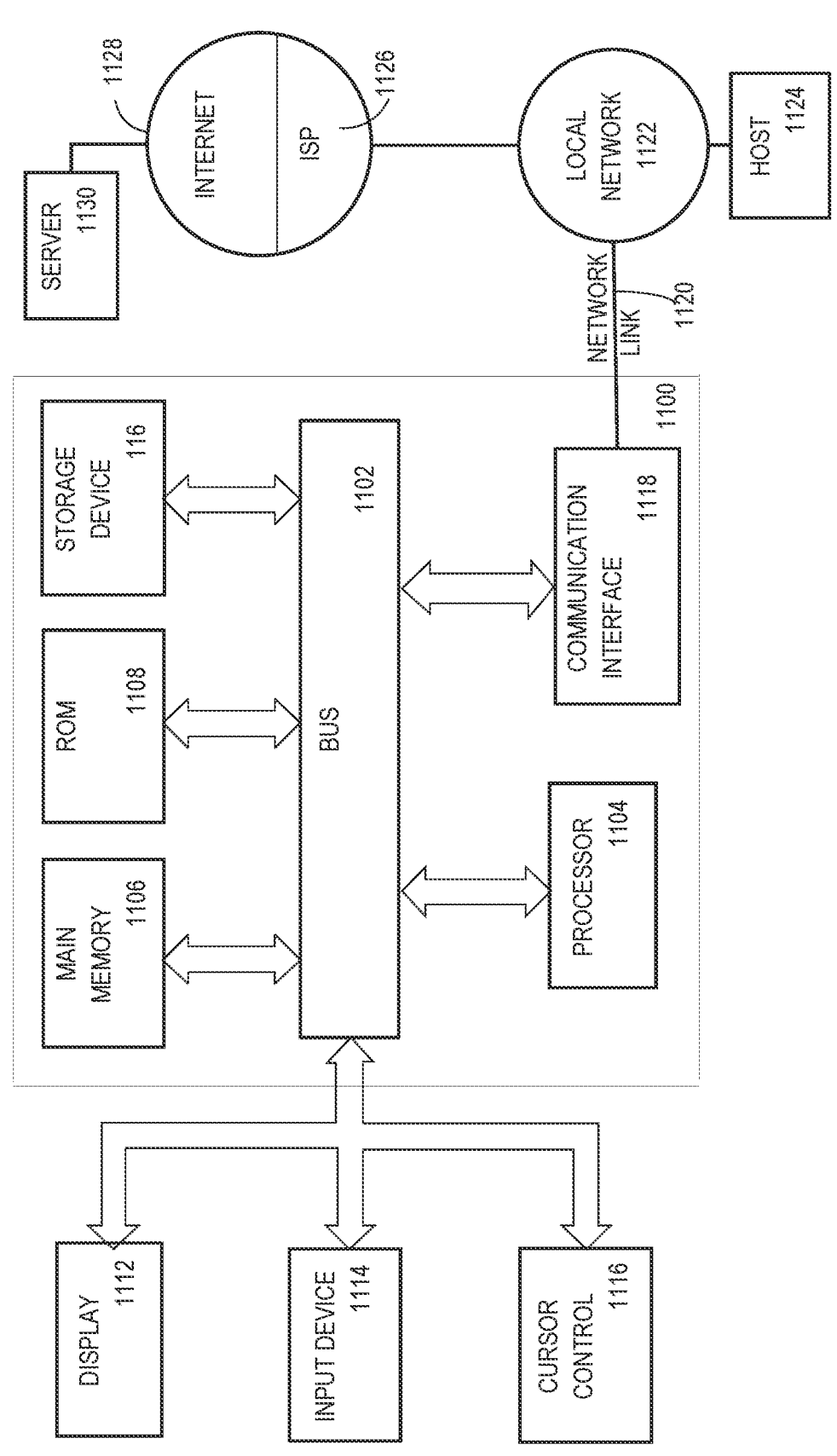
Figure 12:
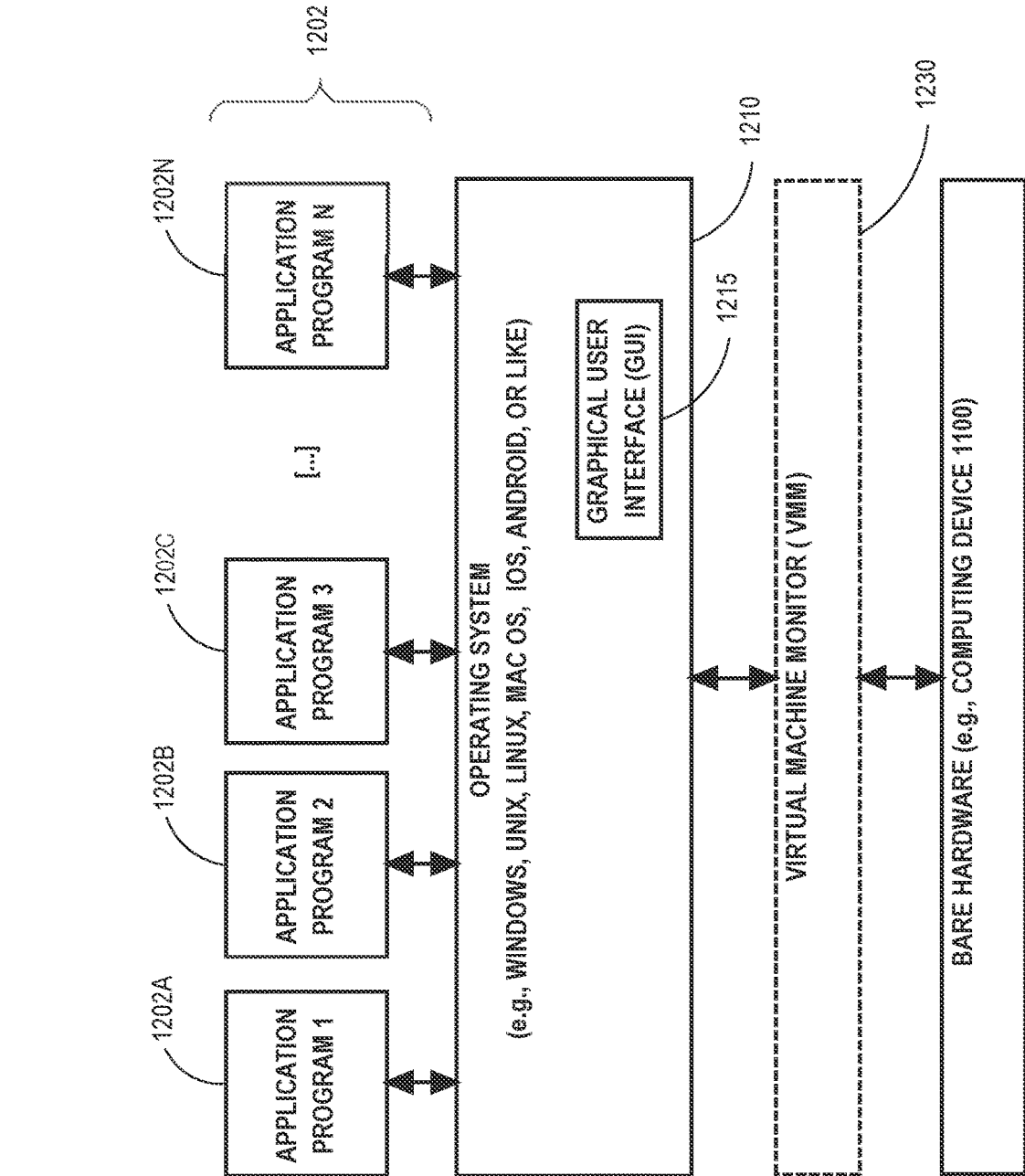

to join native data to a memory resident column vector of external data, in an embodiment;

FIG. 2 is a flow diagram that depicts an example process for using an DBMS to join native data to a memory resident column vector of external data, in an embodiment;

FIG. 3 is a block diagram that depicts an example RDBMS that uses a same encoding dictionary to process native and external data during a relational join, in an embodiment;

FIG. 4 is a scenario diagram that depicts interactions within an example computer that retains a loaded in-memory column vector for repeated use, in an embodiment;

FIG. 5 is a block diagram that depicts an example computer that aggregates multiple in-memory column vectors to form an in-memory table, in an embodiment;

FIG. 6 is a block diagram that depicts an example computer that can refresh external data, in an embodiment;

FIG. 7 is a state diagram that depicts an example lifecycle of external data for a column, in an embodiment;

FIG. 8 is a block diagram that depicts an example computer cluster that contains more distributed data than can be loaded by a single database server, in an embodiment;

FIG. 9 is a block diagram that depicts an example RDBMS that contains a vector processor for acceleration, in an embodiment;

FIG. 10 is a block diagram that depicts an example RDBMS having recovery that includes in-memory column vectors, in an embodiment;

FIG. 11 is a block diagram that illustrates a computer system upon which an embodiment of the invention may be implemented;

FIG. 12 is a block diagram that illustrates a basic software system that may be employed for controlling the operation of a computing system.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer
   2.1 Random Access Memory
   2.2 Native Data
   2.3 DBMS
   2.4 External Data
   2.5 In-Memory Column Vector
   2.6 Global Data Dictionary
   2.7 Data Join
3.0 Example Join Process
   3.1 Configuring
   3.2 Querying
   3.3 Loading
   3.4 Joining
4.0 Compression
   4.1 Shared Encoding Dictionary
   4.2 Dense Key
   4.3 Auxiliary Data
   4.4 Packing 5.0 Retention
   5.1 Materialized View
6.0 In-Memory Table
7.0 Refresh
8.0 Column Lifecycle
9.0 Distributed Partitions
10.0 SIMD
11.0 Recovery Checkpoint
12.0 Hardware Overview
13.0 Software Overview
14.0 Cloud Computing

1.0 General Overview

Techniques are provided for using in-memory column vectors to process data that is external to a database management system (DBMS) and logically join the external data with data that is native to the DBMS. These techniques provide a way to import external results into an DBMS without needing a footprint in durable storage or redo generation. These techniques facilitate exploitation of the full power of OLAP without additional tuning by a database administrator (DBA).

In an embodiment, external data may be loaded and materialized as in-memory compression units (IMCU). Data stored in IMCUs is stored in columnar form in memory. Because the external data is fully materialized in in-memory formats (such as dictionary encoding), the DBMS may use powerful in-memory column techniques described herein to optimize the integration of DBMS data and external Big Data. A DBMS can create a global dictionary on common attributes such as customer ID and dates between a DBMS and external data allowing joins, such as semi-joins and equijoins to be rapidly optimized. The DBA can create join groups between a DBMS and external data, facilitating optimization of joins on common attributes such as customer ID or date.

In an embodiment, a DBA can define in-memory expressions (IMEs) for materializing virtual columns derived from internally-loaded external data. In an embodiment, aggregation can be automatically imposed onto external data using an in-memory compression (IMC) format.

In an embodiment, external data is stored in single-instruction multiple-data (SIMD) compatible formats that facilitate parallel predicate evaluation on external data loaded within the DBMS. The database/query optimizer may use vector-based joins to accelerate joins between DBMS data and loaded external data.

In an embodiment, a computer maintains a data dictionary for native data that is durably stored in an DBMS and external data that is not durably stored in the DBMS. From a client through a connection to the DBMS, the computer receives a query. The computer loads the external data into an in-memory column vector that resides in random access memory of the DBMS. Based on the query and the data dictionary, the DBMS executes a join of the in-memory column vector with the native data. To the client through said connection, the computer returns results of the query based on the relational join.

2.0 Example Computer

Figure 1:
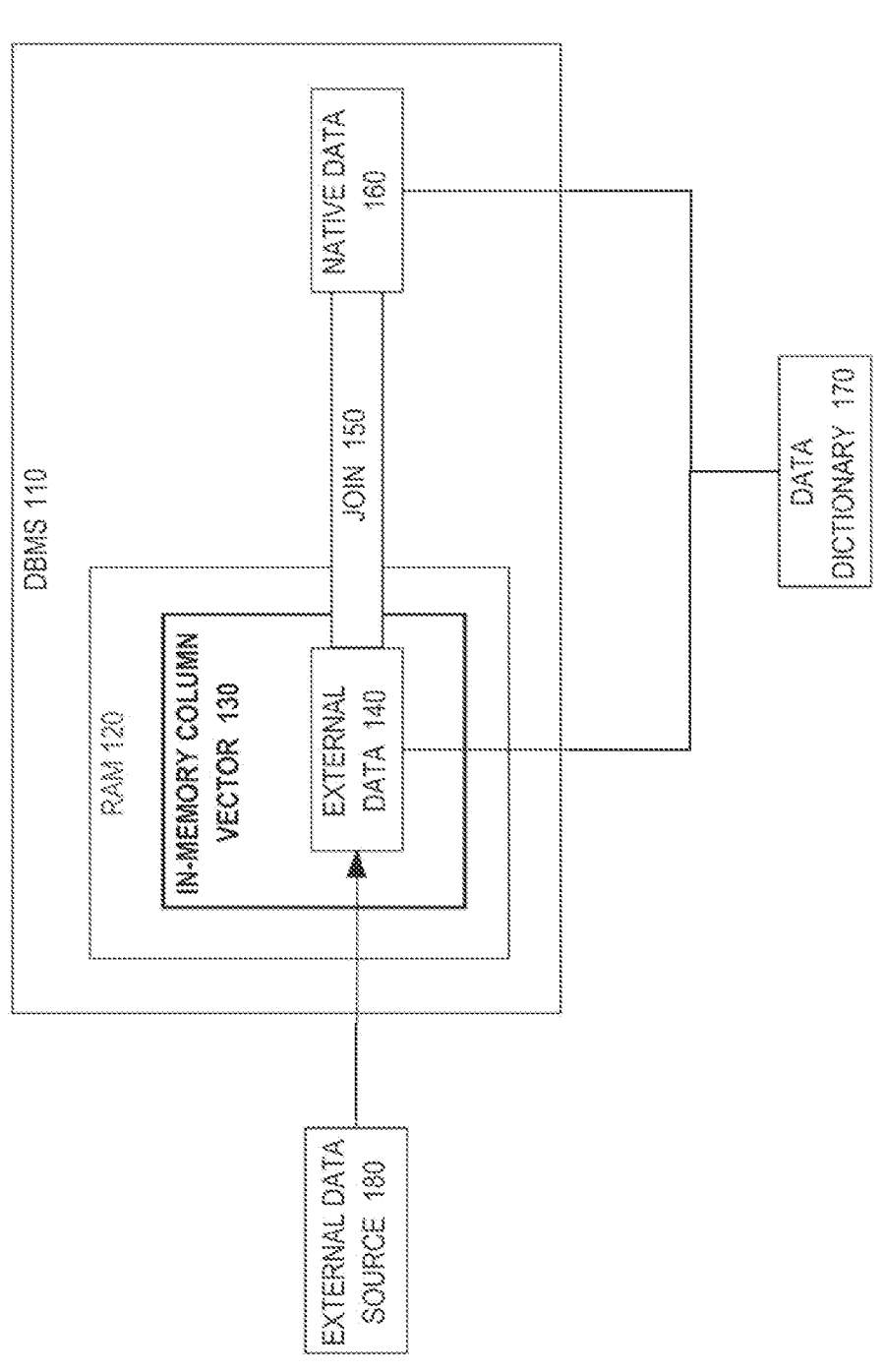
FIG. 1 is a block diagram that depicts an example computer that uses a database management system (DBMS)

FIG. 1 is a block diagram that depicts an example computer 100, in an embodiment. Computer 100 uses a database management system (DBMS) to join native data to a memory resident column vector of external data. Computer 100 may be at least one personal computer, rack server such as a blade, mainframe, virtual machines, or any computing device capable of database analytics such as online analytical processing (OLAP).

2.1 Random Access Memory

Computer 100 hosts DBMS 110 that allocates and uses random access memory (RAM) 120. RAM 120 may be an address space within one or more memory units of computer 100. Embodiments may implement RAM 120 as a volatile memory, such as dynamic RAM (DRAM) or static RAM (SRAM), or a non-volatile memory such as non-volatile RAM (NVRAM) or phase-change RAM (PRAM). In either case, RAM 120 should be implemented with byte or word addressable memory.

2.2 Native Data

DBMS 110 may be a management system for databases such as a relational database, a hierarchical database, a tabular database, a real-time database, a columnar database, a tuple store, a key-value store, or other managed data store. DBMS 110 contains native data 160 that may be durably (persistent) stored, such as on a mechanical or solid state drive (not shown) within or connected to computer 100, such as network attached storage (NAS). Native data may be stored persistently in database files. The data files store data for database objects (e.g. tables, materialized views). DBMS 110 may specify which database files hold which database objects. The data files may comprise data blocks that are in a native format that the software of DBMS 110 is configured to handle. Because the data blocks conform to the native format, the software of DBMS 110 determines which data in which data blocks represents particular content and which database transactions modified or are modifying the data blocks. In an embodiment, native data 160 may include relational tables that are logically composed of rows and columns. Durable storage of tables in native data 160 may be in row major or column major format, such as within files of a filesystem or spanning raw blocks on disk. Although not shown, computer 100 may cache or otherwise load some or all of native data 160 into RAM 120 in a same or different logical format as durably stored.

2.3 DBMS

DBMS 110 may process native data 160, such as during query execution for analytics requested by a client (not shown). The client may include a computer program, such as an ad hoc query tool, a report generator, or a data mining tool. The client may use open database connectivity (ODBC) to access DBMS 110.

2.4 External Data

Although DBMS 110 may provide an efficient, flexible, and reusable analytics platform, a client application may need analysis of more data than DBMS 110 naturally has, such as native data 160. For example, analytics may need weather data within native data 160, but also need topography data that is not included within the content of DBMS 110. Thus, some analysis may need data that is external to DBMS 110 and provided by external data sources such as 180. For example, computer 100 may have data files that are not part of DBMS 110 and that may or may not contain tabular data. For example, computer 100 may host or be connected to a Hadoop distributed file system, which may be external data source 180.

Alternatively, computer 100 may host or connect to an external data source 180 that generates or otherwise provides external data that is programmatically accessible, such as by network socket, inter-process pipe, or application programming interface (API). For example, computer 100 may exchange hypertext transfer protocol (HTTP) messages such as representational state (REST) requests to retrieve remote data encoded as JavaScript Object notation (JSON) or extensible markup language (XML). Depending on the embodiment, an external data source such as 180 may or may not reside on computer 100.

2.5 in-Memory Column Vector

DBMS 110 is configured to load external data 140 from external data source 180 by transferring external data 140 into RAM 120 for subsequent rapid access, such as by query execution. DBMS 110 loads external data 140 into a particular data structure, shown as in-memory column vector 130. In-memory column vector 130, stores values for a particular data field. For example, external data 140 may contain timestamps of purchases, and those timestamps are loaded into in-memory column vector 130. In-memory column vector 130 has a particular storage format that entails contiguous (e.g. compact) storage of field values as a linear array (not shown). For example if each timestamp is eight bytes wide, then in-memory column vector 130 contains a contiguous sequence of memory locations such that storage of a different timestamp begins at every eighth byte. Contiguous storage may entail some padding to achieve a convenient alignment. For example, field values having six bytes may each be padded to eight bytes. In an embodiment, in-memory column vector 130 may be decomposed into dis-contiguous segments that contiguously store subsequences of values. In an embodiment, each segment comprises an in-memory compression unit (IMCU) such as described in related U.S. Pat. No. 10,007,691 listed above. As discussed later herein, DBMS 110 may load other external data, besides 140, from same 180 and/or another external source, into other in-memory column vectors (not shown). For example, DBMS 110 may logically aggregate multiple in-memory column vectors to achieve an in-memory table (e.g. rows and columns) of external data.

2.6 Global Data Dictionary

A query (not shown) or other analysis may direct DBMS 110 to process both of external data 140 and native data 160. To facilitate processing of external data 140 and native data 160, computer 100 maintains data dictionary 170. Data dictionary 170 contains metadata that describes the data fields of external data 140 and native data 160. Data dictionary 170 may contain logical metadata such as field names and data types, and may contain topological metadata that indicates that data 160 is native and data 140 is external. For example, data dictionary 170 may contain configuration and connectivity details that DBMS 110 may need to retrieve external data 140 for loading. Thus, data dictionary 170 differs from a conventional database data dictionary that merely stores metadata of native data 160 but not external data 140.

In an embodiment not shown, DBMS 110 contains data dictionary 170. In an embodiment, data dictionary 170 is remotely accessible. In an embodiment, data dictionary 170 also contains a central set of read-only reference tables and views of metadata about one or more databases of DBMS 110. In an embodiment, data dictionary 170 also contains any of:

The definitions of schema objects in the database (tables, views, indexes, clusters, synonyms, sequences, procedures, functions, packages, triggers, and so on)

How much space has been allocated for, and is currently used by, the schema objects Default values for columns Integrity constraint information The names of database users Privileges and roles each user has been granted Auditing information, such as who has accessed or updated various schema objects Other general database information 2.7 Data Join Analytics may need to correlate external data 140 with native data 160. For example, analytics may request join 150 between external data 140 and native data 160, such as with a relational join such as an equijoin. To perform join 150, DBMS 110 may consult data dictionary 170. For example DBMS 110 may retrieve, from data dictionary 170, type metadata that DBMS 110 may use to infer that data 140 and 160 may be equijoined with or without needing data conversion. Thus, data dictionary 170 may be used as a global repository of schema information of content that is native to DBMS 110 and content that is external to DBMS 110. Before, during, or after performing join 150, DBMS 110 may manipulate, reference, copy, or scan in-memory column vector 130 for rapid aggregation and grouping based on external data 140. For example, DBMS 110 may apply an SQL value aggregation operation such as GROUP-BY, ORDER BY, DISTINCT, or MAX to loaded external data 140 directly or to join results that include native data and/or loaded external data 140.

3.0 Example Join Process

FIG. 2 is a flow diagram that depicts computer 100 performing an example process for using an DBMS to join native data to a memory resident column vector of external data. Thus, FIG. 2 is discussed with reference to FIG. 1.

3.1 Configuring

Step 201 is preparatory. Step 201 maintains a data dictionary for data that is native to an DBMS and data that is external to the DBMS. For example, data dictionary 170 is maintained by computer 100. In an embodiment, computer 100 populates data dictionary 170 by processing data definition language (DDL) commands (e.g. CREATE statement) that describe structured content that is native to DBMS 110 such as a relational table, or content that is external to DBMS 110 such as content available from a remote web service. In an embodiment, computer 100 populates data dictionary 170 with metadata for external data based on an extensible markup language (XML) schema, a document type definition (DTD), field names such as for content having name-value pairs such as JSON, a spreadsheet, or other structured description of external data 140. In embodiments, computer 100 also populates data dictionary 170 with details needed to automate connectivity to external sources of external data 140. For example, a uniform resource identifier (URI) such as a uniform resource locator (URL), which may contain network connectivity information (e.g. protocol, hostname, port, path, driver name, and/or query string) sufficient to connect to external data source 180 and/or retrieve external data 140.

3.2 Querying

The ordering of steps 202-203 depends on embodiments. In an embodiment, step 202 causes step 203, such as when step 202 detects that a query (not shown) refers to external data that DBMS 110 has not yet loaded into an in-memory column vector. In an embodiment, step 202 does not cause step 203 because step 203 occurred during an earlier query that used external data 140. For example, during a subsequent query, external data 140 may already reside in in-memory column vector 130. In step 202, the DBMS receives a query. For example, a client such as an OLAP tool may submit a query to DBMS 110 during a database session over a database connection, such as a multidimensional SQL SELECT statement over ODBC. The query directly specifies or indirectly specifies (such as with a stored procedure invocation) a cause of relational join 150.

In an embodiment, DBMS 110 generates at least one query plan for the query during or soon after step 202. The query plan may have a tree like data structure. Some nodes (e.g. leaves) within the tree may correspond to respective row sources, such as for external data source 180 or an internal table of native data 160. A node that corresponds to a row source may have associated logic (e.g. a driver) that may manage lifecycle concerns such as connectivity, asynchrony, resumption of long lived retrieval of data (e.g. multiple round trips), and distribution aspects such as partitioning, replication, and/or homogeneous or heterogeneous federation. For example, external data source 180 may be an aggregation (e.g. façade) of multiple external data stores that have (e.g. temporally) segregated data. For example, external data source 180 may have storage tiers for data of respective ages. For example, HDFS may supply recent data, and zipped archives may supply older data of a same kind. Techniques for integrating a DBMS and a distributed external data store are presented in related U.S. application Ser. No. 14/733,691.

3.3 Loading

In step 203, the external data is loaded into an in-memory column vector that resides in RAM of the DBMS. For example, DBMS 110 may send a REST GET to a remote web service that returns external data 140 encoded as JSON that DBMS 110 may unmarshall into RAM 120 or may process with a streaming parser. For example, the JSON may encode an array of objects having identically-named fields. For example, each JSON object may have an 'age' integer field. DBMS 110 may extract the values of the age field of the objects, convert the values from JSON text into native integers and contiguously store the integers as external data 140 within in-memory column vector 130. In an embodiment, DBMS 110 uses memory-mapped input/output (I/O) to bulk copy a column of external data, as is, from an external data file into an in-memory column vector. For example, DBMS 110 may use virtual memory to memory map a record columnar file (RCFile). Techniques for marshalling JSON data into an in-memory column vector are presented in related U.S. application Ser. No. 15/162,235.

In an embodiment, external data source 180 resides in a (e.g. remote) compute cloud or data grid. Intermediating infrastructure, such as the global Internet or other wide area network (WAN), may increase data retrieval latency by an order of magnitude, thereby making local caching by in-memory column vector 130 attractive for acceleration, especially when external data 140 is repeatedly used by DBMS 110. For example, public clouds provided by Oracle and Amazon may provide data storage mechanisms such as a flat file of data blocks or more comprehensive abstractions such as object storage. Cloud infrastructure is discussed later herein.

3.4 Joining

Based on the query received in step 202 and the data dictionary populated in step 201, the DBMS executes a join between external and native data during step 204. For example, DBMS 110 executes join 150 based on the query, data dictionary 170, and data 140 and 160. In an embodiment, data dictionary 170 indicates that data 140 and 160 have a same or compatible data type. The query may specify a join operator, such as equality for an equijoin. In a relational DBMS (RDBMS) embodiment, data dictionary 170 declares native data 160 as a column of a relational table. Native data 160 may be loaded into another in-memory column vector (not shown) in RAM 120. DBMS 110 may have a relational join engine that can join two relational tables of DBMS 110. In an embodiment, the relational join engine is optimized for joining tables of DBMS 110 whose join columns are stored in in-memory column vectors in RAM 120. The relational join engine may use a same or similar logic to perform a relational join between two in-memory column vectors, regardless of whether both column vectors were loaded from native data (e.g. relational tables), or both vectors were loaded from external data, or one vector was loaded with native data and the other vector with external data such as for relational join 150.

DBMS 110 may accumulate the results of the query, including tuples produced by relational join 150, as a result set in memory, on disk, or partially in memory and partially on disk. In step 205, query results are returned to the client. For example, DBMS 110 may serialize the result set over the same session connection that delivered the query. In an embodiment, the query specifies that the results not be directly returned but instead be saved to file or to a relational table such as a temporary table that a subsequent query may retrieve or perform further analytics.

4.0 Compression

FIG. 3 is a block diagram that depicts an example relational DBMS (RDBMS) 310, in an embodiment. RDBMS 310 uses a same encoding dictionary to process native and external data during a relational join. RDBMS 310 may be an implementation of DBMS 110. Native data 360 may be a relational table column of RDBMS 310. Payload in-memory column vector 333 contains external data. Both of payload in-memory column vector 333 and native data 360 are compressed without loss by dictionary encoding. Both of payload in-memory column vector 333 and native data 360 contain compressed data comprising dictionary keys. However, payload in-memory column vector 333 and native data 360 may be encoded by a same or different encoding dictionary. Native and/or external data may be loaded from durable storage or external source as already dictionary-encoded data. Alternatively, RDBMS 310 may compress (dictionary encode) native and/or external data during loading into random access memory. A global data dictionary (not the encoding dictionary) may declare which data needs compression and which data is already compressed. If payload in-memory column vector 333 and native data 360 are encoded according to different encoding dictionaries (not shown), then RDBMS 310 may decode payload in-memory column vector 333 and native data 360 and perform a relational join based on the decoded values. If payload in-memory column vector 333 and native data 360 are encoded according to a same encoding dictionary, then RDBMS 310 may perform the same relational join faster by not decoding and instead join based on the keys as they occur in the compressed data.

4.1 Shared Encoding Dictionary

RDBMS 310 may create encoding dictionary 370 based on distinct values in one, some, or all of: external data, native data 360, or an in-memory column vector that contains either native data or external data. A DBA may command RDBMS 310 to create encoding dictionary 370 based on one, some, or all of: external data, native data 360, or an in-memory column vector that contains either native data or external data. RDBMS 310 may spontaneously create encoding dictionary 370 responsive to detecting that values of native data 360 entirely or partially overlap with values of external data. For example, RDBMS 310 may populate encoding dictionary 370 with a union of partially overlapping distinct values of native data 360 and external data. RDBMS 310 may decide to create encoding dictionary 370 in response to various circumstances. For example, RDBMS 310 may detect that repeated (e.g. exceeding a threshold) same or similar joins between native data 360 and same or similar external data. RDBMS 310 may detect complete or partial similarity between multiple existing encoding dictionaries associated with different respective sources, and RDBMS 310 may combine or substitute such encoding dictionaries in a global data dictionary that associates encoding dictionaries with data sources (e.g. tables). RDBMS 310 may detect complete or partial similarity between unencoded data values of different source during incidental or coincidental processing, such as when a same query uses two different sources of similar data values, or when two different queries each use a different source of similar data values. RDBMS 310 may retroactively create encoding dictionary 370 after loading and using payload in-memory column vector 333.

As shown, payload in-memory column vector 333 and native data 360 are both encoded according to encoding dictionary 370. Thus, RDBMS 310 may perform relational join 350 between payload in-memory column vector 333 and native data 360 without decompression. For example, key A can be joined (or compared, matched, or filtered) directly without decompressing 'A' into "Central". As shown, the values of encoding dictionary 370 are alphabetically sorted. As shown, encoding dictionary 370 may assign keys A-E to values that are naturally sorted. Thus, relative comparisons (e.g. join not an equijoin) such as '<' or '>=' yield the same result for compressed and uncompressed data, thereby making decompression unnecessary. Techniques for filtration based on a compound predicate for multiple column vectors are presented in related U.S. application Ser. No. 15/702,431.

RDBMS 310 need not access encoding dictionary 370 to perform relational join 350. It may be sufficient for RDBMS 310 to access a global data dictionary, such as 170 (data dictionary 170 may or may not contain encoding dictionary 370), to merely determine that payload in-memory column vector 333 and native data 360 are encoded by a same encoding dictionary 370. Techniques for shared encoding dictionaries are presented in related U.S. application Ser. No. 15/294,460.

4.2 Dense Key

RDBMS 310 may be used for multidimensional OLAP that data mines external data and correlates the external data with native data 360. Multidimensional OLAP involves voluminous facts that are associated with dimensions, such as in a snowflake pattern of joins. For example, native data 360 may be a dimension, and payload in-memory column vector 333 may be facts. A multi-system join is generally not supported and would be unbearably slow to perform, especially when additional work such as grouping or sorting is involved. However, RDBMS 310 may optimize such a case as follows.

RDBMS 310 may use a dense key and/or key vector to optimize joins with in-memory aggregation. A dense key is a numeric key that is stored as a native integer and has a range of values. A dense key may represent one or more encoding dictionary keys or entries. A dense key may be an offset into an ordered list of encoding dictionary keys or entries. A dense join key represents all join keys whose join columns come from a native database table or an in-memory column vector that is loaded with external data or native data. A dense grouping key represents all grouping keys whose grouping columns come from a native table or in-memory column vector. A key vector is a data structure that maps between dense join keys and dense grouping keys. A key vector enables fast lookups. RDBMS 310 can use dense keys and/or a key vector for filtration during a scan (to facilitate a join) of payload in-memory column vector 333.

Aggregation based on dense keys facilitates vector joins and GROUP BY operations to occur simultaneously with the scan of payload in-memory column vector 333. For example, RDBMS 310 may infer or extract dense keys during a scan of a dimension (native data 360) to build a key vector, and then use the key vector for joining native data 360 to payload in-memory column vector 333, while simultaneously sorting, filtering, and/or grouping by payload in-memory column vector 333 or native data 360. In an embodiment, RDBMS 310 may infer or extracts dense keys directly from encoding dictionary 370, which need not occur synchronously with query execution. A dense join key may implement a join group (of one or more dictionary keys). Dense keys are presented in related U.S. application Ser. No. 15/702,659.

4.3 Auxiliary Data

Payload in-memory column vector 333 may be accompanied by additional in-memory column vectors that store: a) other external data (not shown), b) relational table columns (not shown), or c) auxiliary/synthetic data as shown in in-memory column vectors 331-332. In the shown embodiment, RDBMS 310 creates and populates serial in-memory column vector 332 when loading external data. Serial in-memory column vector 332 may be populated with a serial number such as a row identifier that monotonically increases as values are loaded into one or more in-memory column vectors, such as 333. The row identifier may explicitly or implicitly be included in a result set produced by relational join 350. RDBMS 310 may use the row identifiers (or another mechanism) to provide window functions upon payload in-memory column vector 333. Techniques for row identification for in-memory column vectors are presented in related U.S. application Ser. No. 14/097,575.

A synthetic column may be derived from the content of other column(s), such as a lazily or eagerly materialized virtual column that captures the results of an expression applied to other column(s). For example, values of encoding dictionary 370 may be time zones, and virtual in-memory column vector 331 may record which values in payload in-memory column vector 333 represent coastal time zones and which values represent continental (landlocked) time zones. For example zero-based rows 2-3 of virtual in-memory column vector 331 reflect that the Eastern time zone is coastal.

4.4 Packing

Although keys of encoding dictionary 370 are shown as individual letters, the keys may instead be integers or bit-packed integers. For example, keys A-E are five keys, which need only three bits each as bit-packed integers. Thus, payload in-memory column vector 333 and native data 360 may store multiple keys in a single byte (octet).

5.0 Retention

FIG. 4 is a scenario diagram that depicts interactions within example computer 400, in an embodiment. Computer 400 retains a loaded in-memory column vector for repeated use. Computer 400 may be an implementation of computer 100. Computer 400 includes client 405 that has a session connection to RDBMS 410 for submitting queries and retrieving results. Execution of queries may need access to external and native data. For example at time A, client 405 sends a first query that accesses external data to RDBMS 410. At time B, RDBMS 410 detects that the external data needed by the first query has not yet been loaded. Thus also at time B, RDBMS 410 loads the needed external data into in-memory column vector 430 from external source 480. At time C, RDBMS 410 executes the first query, which entails joining in-memory column vector 430 to native data (not shown). To perform the join, RDBMS 410 may need to scan or otherwise process the content of in-memory column vector 430 as shown.

At time D, client 405 (or a different client) sends a second query that accesses the same external data that the first query accessed. Also at time D, RDBMS 410 detects that the needed external data is already loaded into in-memory column vector 430. Thus, the execution of the second query need not entail retrieve data from external source 480. Thus, RDBMS 410 can more or less immediately use in-memory column vector 430 as is to perform another join between the same external data and the same or different native data, which may include scanning in-memory column vector 430 as shown at time E.

Eventually, RDBMS 410 may manually or automatically decide to delete in-memory column vector 430. For example, RDBMS 410 may include a cache manager or other memory manager that can evict or retain in-memory column vectors (or a subset of their constituent IMCU segments) according to demand for memory. For example and although not shown, after time E, RDBMS 410 may delete in-memory column vector 430, receive a third query for the same external data, and reload the same external data from external source 480 into a new in-memory column vector. In an embodiment, an in-memory column vector may be (eagerly) preloaded such as according to a database administration command and/or may be pinned in memory to prevent automatic eviction. In an embodiment, RDBMS 410 may record how much time is spent during a retrieval of external data from external source 480. In an embodiment, RDBMS 410 may make eviction decisions based on recorded retrieval duration, memory footprint, recent usage, or other metrics of in-memory column vectors, such as when deciding which external data or native data to evict from random access memory. Eviction heuristics for in-memory column vectors are presented in related U.S. application 10,007,691.

5.1 Materialized View

In an embodiment, retention and reuse of contents of an in-memory column vector require additional configuration. For example, RDBMS 410 may implement or otherwise treat an in-memory external data as part of a materialized database view, thereby enabling same or similar logic to handle in-memory external data and conventional materialized views. Thus, some configuration settings available for materialized views may also be available or needed for in-memory external data. For example, Oracle has QUERY_REWRITE_INTEGRITY as a session parameter that may need to be set to STALE_TOLERATED to achieve retention and reuse of loaded external data.

6.0 In-Memory Table

FIG. 5 is a block diagram that depicts an example computer 500, in an embodiment. Computer 500 aggregates multiple in-memory column vectors to form an in-memory table. Computer 500 may be an implementation of computer 100. Computer 500 includes RDBMS 510 that executes queries 591-592. Each query may access external data such as 541-543 from external sources such as 581-582 that are outside of RDBMS 510. RDBMS 510 may lazily load external data into in-memory column vectors, such that external data is not loaded until actually needed for a query.

Although not shown, computer 500 or RDBMS 510 has a global data dictionary that defines table 505 as stored in random access memory as a collection of columns also stored in random access memory. The global data dictionary may also declare which external sources 581-582 supply external data for which columns of in-memory table 505 and which mechanisms, protocols, and configurations to use for external data retrieval. The global data dictionary may declare which columns of in-memory table 505 should be eagerly loaded and which columns can be lazily loaded. For example, some columns may need loading as soon as any column of in-memory table 505 is accessed. Other columns need not be loaded until actually used. Thus, in-memory table 505 may sometimes have loaded in-memory column vectors for only a subset of the columns of in-memory table 505.

For example, query 591 may cause loading of no external data except for external data 541 into in-memory column vector 531 from external source 581. At a same or different time, query 592 may cause loading of external data 542-543 in respective in-memory column vectors 532-533 from respective external sources 581-582. In an embodiment, one or more of in-memory column vectors 531-533 may be sorted or otherwise ordered to correlate with contents of another of in-memory column vectors 531-533. For example, external source 581 may return data in temporal (i.e. timestamp) ordering, whereas external source 582 may return data alphabetically. In embodiments, join techniques such as keys and/or hashing are used to reorder or otherwise correlate in-memory column vectors 531-533 with each other. In an embodiment, sorting or other reordering occurs during loading of an in-memory column vector. For example, external data 541 may be retrieved from external source 581 in a particular order. For example, reordering may be delegated to external source 581 and reflected in external data 541 as retrieved.

Regardless of whether all or only some columns of in-memory table 505 are loaded into random access memory, clients and RDBMS 510 may use in-memory table 505 as if it were an ordinary relational table already native to RDBMS 510. RDBMS 510 may or may not use a same logic to process in-memory table 505 as used to process native relational tables. Likewise, client may or may not care (or be able to detect) that table 505 is in memory or not, or contains external data or not.

7.0 Refresh

FIG. 6 is a block diagram that depicts an example computer 600, in an embodiment. Computer 600 can refresh external data. Computer 600 may be an implementation of computer 100. At time T1, RDBMS 610 loads external data 640A from an external file stored in Hadoop distributed filesystem (HDFS) 680 into in-memory column vector 630A that resides in RAM 620 of RDBMS 610. The file may conform to a format such as column separated values (CSV), spreadsheet, Apache Parquet, optimized row columnar (ORC), Apache Avro, JSON, or console log.

Between times T1-T2, various queries (not shown) may access in-memory column vector 630A and/or join it with native data such as 660. However, the external file may be updated or replaced between times T1-T2. Thus, RDBMS 610 may refresh content by loading a new version of the external data, shown as 640B. Depending on the embodiment, RDBMS 610 may load external data 640B into a new in-memory column vector 630B as shown, or reuse in-memory column vector 630A by overwriting external data 640A with 640B. After loading in-memory column vector 630B, RDBMS 610 may delete in-memory column vector 630A or retain it as an older version. In an embodiment, a client may specify which version of the external data to use during query execution after time T2. RDBMS 610 may maintain a catalog of declarations of the structures, formats, and types of external data (such as 640) that are defined once, such as in a global dictionary. Each time a map/reduce jobs creates a revised Big Data summary, the DBA may choose a convenient time to automatically adjust the global dictionary, in-memory expressions (IMEs), join groups, or other objects that depend on the declared structure of external data. The catalog of external data formats may be persistent and discoverable. Thus once loaded into RDBMS 610, external data becomes "first class" data capable of being processed by RDBMS 610 in the same ways as native database data in some cases.

8.0 Column Lifecycle

Because external and native data are hosted by separate data systems, a DBMS's in-memory column vector of external data may become stale or otherwise incoherent or inconsistent with the external system. Thus, the contents of the in-memory column vector may need refreshing (reloading). For example, the external data may be a daily digest of other data. Thus, the contents of the in-memory column vector become stale at most one day after being loaded into the DBMS. The DBMS may have a global data dictionary with a dictionary entry that describes the external data. The dictionary entry may specify periodic automatic refreshing of the external data from the external source. Alternatively, a human DBA may manually force a refresh, such as when the external system updates external data at irregular intervals. Alternatively, the DBMS may automatically periodically poll the external system to check whether or not the external data has changed. The following are mechanisms and scenarios for various data lifecycles.

FIG. 7 is a state diagram that depicts an example lifecycle of example external data 740 for a column, in an embodiment. External data 740 may be an implementation of external data 640A-B. Initially, external data 740 is not yet loaded into random access memory of an RDBMS, shown as unloaded 700. At time T1, a stimulus such as a query causes the RDBMS to load external data 740 from an external source (not shown) into a first in-memory column vector (not shown). Thus at time T1, the lifecycle state of external data 740 transitions from unloaded 700 to one version loaded 710.

At time T2, another stimulus causes the RDBMS to refresh external data 740. For example, the RDBMS may periodically poll to see if a new version of external data 740 is externally available for reloading or may periodically unconditionally reload regardless of whether external data 740 has changed or not. Such reloading occurs in an embodiment the pulls data from an external system. Alternatively, the external system may autonomously push revised content into RDBMS, such as by invoking a stored procedure. Alternatively, a DBA may manually cause a refresh of external data 740. In any case, reloading by the RDBMS is shown as loading another version 720, which may reuse (overwrite contents) the first in-memory column vector or use a second in-memory column vector. If the first in-memory column vector is reused for reloading, shown as T3-A, then the lifecycle returns to one version loaded 710, which is the new version of external data 740 that overwrote the previous version of external data 740.

Otherwise, the new version of external data 740 is loaded into the second in-memory column vector, shown as time T3-B and both versions loaded 730, which may or may not be a lifecycle state that is publicly visible to clients. In an embodiment, both versions loaded 730 is an invisible transient state that is immediately ended at time T4 by the RDBMS deleting the first in-memory column vector and retaining the second in-memory column vector. Thus, the old version of external data 740 is replaced by a new version of external data 740 that returns to a state of one version loaded 710. In an embodiment, both versions loaded 730 may be the state of external data 740 indefinitely, and depending on the embodiment, clients may explicitly or implicitly access the old or new version(s).

9.0 Distributed Partitions

An external data source and a DBMS may be arranged in a data pipeline. For example, the DBMS may natively store sales data for a current day, while an external Big Data system may archive historical sales data. In another example the pipeline is reversed, such that the external system has recent sales data and the DBMS has a condensed form (e.g. subset of data fields) of historical sales data. Thus in some examples, neither the external system nor the DBMS has all of the data, even though the data of the two systems is logically parts of a same data set. The following are mechanisms and scenarios for various data distribution schemes.

FIG. 8 is a block diagram that depicts an example computer cluster 800, in an embodiment. Cluster 800 contains more distributed data than can be loaded by a single database server. Database servers 811-813 may intercommunicate with each other and external data sources over computer network(s). Each of database servers 811-813 may be an implementation of computer 100. Although not shown, database servers 811-813 are part of an RDBMS that maintains a distributed database composed of one database instance per database server. Each database instance may store partitioned and/or replicated data of the distributed database.

Some data may be too big to conveniently store entirely within the RDBMS. For example, a click stream may be partitioned into one file per day in HDFS, and copies of recent day(s) may also be stored as table partitions in the RDBMS. For example, database server 860 has internal (native) partition 860 that may have yesterday's clicks. Older days are available only as respective external partitions 821-823. Database servers 811-812 may load external partitions 821-823 into respective in-memory column vectors 831-833, shown as respective external partition data 841-843.

Global data dictionary 870 declares which partitions are associated with which database servers, and which partitions are external or internal. In an embodiment, the RDBMS uses same or similar logic to process loaded partitions of external and native data. For example, the RDBMS may execute a query, such as a scan or join, that treats loaded partitions 841-843 and 860 as a single table. Although not shown, database server 813 may load a table column of internal partition 860 into an in-memory column vector. In an embodiment, the RDBMS uses same or similar logic to process an in-memory column vector, regardless of whether the content of the in-memory column vector is partitioned or not, and regardless of whether the content is internally or externally sourced.

10.0 SIMD

FIG. 9 is a block diagram that depicts an example RDBMS 910, in an embodiment. RDBMS 910 contains a vector processor for acceleration. RDBMS 910 may be an implementation of DBMS 110. The vector processor executes single-instruction multiple-data (SIMD) instructions such as 940. SIMD instruction 940 simultaneously processes multiple values of a limited fixed size, such as values having a few bits or a few bytes. Thus, SIMD is ideal for processing integers of modest width, Booleans, individual characters, and dictionary encoding keys. The simultaneously-processed multiple values may be packed into one central processing unit (CPU) register, or each value may have its own register. Fixed size may be achieved by padding.

Such vector processing may accelerate scans and joins. As shown, SIMD instruction 940 scans for a character whose value is alphabetically less than 'C'. For example, in-memory column vector 930 may contain character values, dictionary keys, or small integers. For example, each value may contain at most eight bits. Values with fewer bits may be zero padded or sign padded to achieve eight bits.

SIMD instruction 940 may simultaneously process four values that may already be packed in a four-byte register or unpacked in four registers. For example, a previous instruction may have taken the first four (shown bold) values (bytes) from in-memory column vector 930 and copied them together as a machine word into a same register. SIMD instruction 940 simultaneously compares each of the four values to a constant 'C'. Each individual value comparison yields a Boolean encoded as one of the four bits in bitmap 950. Bitmap 950 may reside as a machine word in a general purpose register or as condition codes in a flags register. Execution of branch if zero instruction 960 detects whether any bit of bitmap 950 is set (1). As shown, no bits are set in bitmap 950. Thus, none of the first four values are less than 'C'. Thus, execution proceeds to not found continue scan 970, in which case the next four values can be copied from in-memory column vector 930 into register(s) to be processed by reissuing SIMD instruction 940 and further repeating the instruction sequence. Thus, RDBMS 910 may bulk scan or bulk join in-memory column vector 930.

Eventually RDBMS 910 may encounter a value in in-memory column vector 930 that actually is less than 'C', such as 'B' or 'A'. In that case, at least one bit of bitmap 950 is set to 1 by SIMD instruction 940. Thus, branch if zero instruction 960 proceeds to found stop scan 980, such as when scanning while executing an EXISTS clause in SQL. Alternatively, RDBMS may exhaustively scan or join all of the values of in-memory column vector 930. Scan acceleration with in-memory column vectors is presented in related U.S. application Ser. No. 15/713,365.

SIMD may be used to accelerate a join between native data and in-memory column vector 930, and/or grouping or sorting of in-memory column vector 930 or the native data or the join results. As explained above, processing of a star or snowflake of multidimensional OLAP that spans native and external data may be accelerated with a shared encoding dictionary, dense grouping keys, and/or a key vector. Because dictionary keys are compact, and dense grouping keys are even more compact, both kinds of keys are amenable for SIMD. Thus, SIMD may accelerate joining, sorting, and/or grouping data from both an external system and an RDBMS. SIMD acceleration with in-memory column vectors is presented in related U.S. application Ser. No. 15/702,526.

11.0 Recovery Checkpoint

FIG. 10 is a block diagram that depicts an example RDBMS 1010, in an embodiment. RDBMS 1010 has recovery that includes in-memory column vectors. RDBMS 1010 may be an implementation of DBMS 110. At various times, such as periodically, by automated criteria, or on demand, RDBMS 1010 creates a recovery checkpoint, such as 1070, of a database to durably safeguard uncommitted work in progress in a way that can be restored and resumed in case of a crash. Recovery checkpoint 1070 is saved in durable storage 1005 that may be a local disk or NAS. Recovery checkpoint 1070 may be incremental (only data changes since previous checkpoint) or full (all database content regardless of age).

During ordinary operation, RDBMS 1010 loads in-memory column vector 1030 with external data from an external source (not shown). Also during ordinary operation, RDBMS 1010 executes data manipulation language (DML) commands, such as UPDATE in SQL, that causes changes to native data 1060. As such changes occur, RDBMS 1010 records (shown as time T1) the changes in undo logs and redo logs, such as 1090A. To save uncommitted work in progress at time T2, recovery checkpoint 1070 contains copies of redo/rollforward logs and/or undo/rollback logs, such as change log 1090B that is more or less a copy of change log 1090A.

If RDBMS 1010 crashes and/or the database contents becomes corrupt, the database can be recovered by restoring a full checkpoint and/or one or more incremental checkpoints. Recovery at time T3 may involve restoring change logs, such as copying change lock 1090B to replace change log 1090A. Recovery may also entail, at time T4, RDBMS 1010 replaying undo logs to roll back aborted transactions and replaying redo logs to roll forward and/or resume uncommitted transactions.

RDBMS 1010 has checkpoint writing and reading logic that may be reused or adapted for saving in-memory column vectors, such as for when actually reloading external data from an external source would take too long or provide a more recent version of the external data, which may be unwanted. In an embodiment, a checkpoint command or checkpointing configuration lists which in-memory column vectors should be included in checkpoints. In an embodiment, a data dictionary declares (e.g. in external data descriptions) which in-memory column vectors should be included in checkpoints.

Thus at time T2, RDBMS 1010 may also save in-memory column vector 1030 as column vector dump 1080 in recovery checkpoint 1070. For example, RDBMS 1010 may flush in-memory column vector 1030, more or less as is, to disk such as when column vector dump 1080 is a memory mapped file. Recovery checkpoint 1070 may contain metadata (not shown) that lists which in-memory column vectors are recorded in recovery checkpoint 1070. Thus also during recovery at time T3, RDBMS 1080 may reload in-memory column vector 1030 from column vector dump 1080.

12.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 116, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 116. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 116. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 116 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 116, or other non-volatile storage for later execution.

13.0 Software Overview

FIG. 12 is a block diagram of a basic software system 1200 that may be employed for controlling the operation of computing system 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computing system 1100. Software system 1200, which may be stored in system memory (RAM) 1106 and on fixed storage (e.g., hard disk or flash memory) 116, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 116 into memory 1106) for execution by the system 1200. The applications or other software intended for use on computer system 1100 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of computer system 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the computer system 1100.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of computer system 1200 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

14.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

maintaining a data dictionary for:

native data that is persisted in a database management system (DBMS), and external data that is not persisted in the DBMS;

loading, based on the data dictionary, the external data into a first in-memory column vector of a plurality of in-memory column vectors that reside in a random access memory of the DBMS, wherein said loading the external data comprises:

dictionary encoding the external data, and generating a monotonically increasing sequence of distinct row numbers;

generating a second in-memory vector of said plurality of in-memory column vectors that contains the monotonically increasing sequence of distinct row numbers;

after said loading and dictionary encoding the external data, receiving a query; and executing the query based on: the data dictionary, said monotonically increasing sequence of distinct row numbers, and the plurality of in-memory column vectors;

wherein the method is performed by one or more computers.

2. The method of claim 1, wherein results of the query include a particular distinct row number of said monotonically increasing sequence of distinct row numbers.

3. The method of claim 1 further comprising using, for a relational operation, a particular distinct row number of said monotonically increasing sequence of distinct row numbers.

4. The method of claim 3 wherein said using, for a relational operation, a particular distinct row number comprises using, for a relational join, said particular distinct row number.

5. The method of claim 4 further comprising performing the relational join by using a dense key while scanning the first in-memory column vector that contains the external data.

6. The method of claim 5 further comprising applying, based on said monotonically increasing sequence of distinct row numbers, a window function to the first in-memory column vector that contains the external data.

7. The method of claim 6 further comprising generating the dense key based on a column in a relational table persisted in the DBMS.

8. The method of claim 7 wherein said generating the dense key comprises obtaining the dense key based on an encoding dictionary of the column in the relational table.

9. The method of claim 4 wherein the relational join comprises using an octet that contains multiple key values.

10. The method of claim 1 further comprising:

persisting a database checkpoint that contains the plurality of in-memory column vectors;

copying the plurality of in-memory column vectors into the random access memory of the DBMS.

11. One or more non-transitory computer-readable media storing instructions that, when executed by one or more processors, cause:

maintaining a data dictionary for:

native data that is persisted in a database management system (DBMS), and external data that is not persisted in the DBMS;

loading, based on the data dictionary, the external data into a first in-memory column vector of a plurality of in-memory column vectors that reside in a random access memory of the DBMS, wherein said loading the external data comprises:

dictionary encoding the external data, and generating a monotonically increasing sequence of distinct row numbers;

generating a second in-memory vector of said plurality of in-memory column vectors that contains the monotonically increasing sequence of distinct row numbers;

after said loading and dictionary encoding the external data, receiving a query; and executing the query based on: the data dictionary, said monotonically increasing sequence of distinct row numbers, and the plurality of in-memory column vectors.

12. The one or more non-transitory computer-readable media of claim 11, wherein results of the query include a particular distinct row number of said monotonically increasing sequence of distinct row numbers.

13. The one or more non-transitory computer-readable media of claim 11 wherein the instructions further cause using, for a relational operation, a particular distinct row number of said monotonically increasing sequence of distinct row numbers.

14. The one or more non-transitory computer-readable media of claim 13 wherein said using, for a relational operation, a particular distinct row number comprises using, for a relational join, said particular distinct row number.

15. The one or more non-transitory computer-readable media of claim 14 wherein the instructions further cause performing the relational join by using a dense key while scanning the first in-memory column vector that contains the external data.

16. The one or more non-transitory computer-readable media of claim 15 wherein the instructions further cause applying, based on said monotonically increasing sequence of distinct row numbers, a window function to the first in-memory column vector that contains the external data.

17. The one or more non-transitory computer-readable media of claim 16 wherein the instructions further cause generating the dense key based on a column in a relational table persisted in the DBMS.

18. The one or more non-transitory computer-readable media of claim 17 wherein said generating the dense key comprises obtaining the dense key based on an encoding dictionary of the column in the relational table.

19. The one or more non-transitory computer-readable media of claim 14 wherein the relational join comprises using an octet that contains multiple key values.

20. The one or more non-transitory computer-readable media of claim 11 wherein the instructions further cause:

persisting a database checkpoint that contains the plurality of in-memory column vectors;

copying the plurality of in-memory column vectors into the random access memory of the DBMS.

* * * * *